United States Patent
Corson

[15] 3,695,666
[45] Oct. 3, 1972

[54] TAILGATE BUMPER MOUNT

[72] Inventor: Claude E. Corson, Middlebury, Ind.
[73] Assignee: Coachmen Industries, Inc., Middlebury, Ind.
[22] Filed: Sept. 21, 1970
[21] Appl. No.: 74,062

[52] U.S. Cl. ................293/73, 293/69, 296/23 MC, 296/57
[51] Int. Cl. ............................................B60r 19/04
[58] Field of Search..........293/60, 64, 65, 66, 67, 69, 293/73; 296/23 MC, 57, 58, 62; 280/166

[56] References Cited

UNITED STATES PATENTS

| | | | |
|---|---|---|---|
| 3,282,368 | 11/1966 | Pittera | 180/53 |
| 2,796,287 | 6/1957 | Moyes | 296/57 |
| 2,767,016 | 10/1956 | Wood | 296/57 |
| 3,176,903 | 4/1965 | Farley | 224/42.03 |
| 3,488,077 | 1/1970 | Miller | 293/73 |

Primary Examiner—Arthus L. La Point
Assistant Examiner—Robert Saifer
Attorney—Oltsch & Knoblock

[57] ABSTRACT

A tailgate bumper device for attachment to a truck or similar vehicle. The tailgate bumper device includes a support member which is adapted for securement to the vehicle below the bed thereof and adjacent the bed opening. The support member includes an extension part and a pivotal part which is located rearwardly of the bed opening and which is connected to the extension part so as to be shiftable about a substantially horizontal pivotal axis fore and aft of the vehicle. The pivotal part carries means for securing the tailgate of the vehicle thereto and is shiftable about its pivot connection between a first position in which the tailgate is caused to span the bed opening and a second position in which the tailgate is located below the bed opening to expose the bed of the truck. A bumper is carried by the support member and is attachable first to the extension part of the support member when the pivotal part thereof is positioned in its first position and secondly to the pivotal member when the pivotal member is positioned in its second position.

10 Claims, 5 Drawing Figures

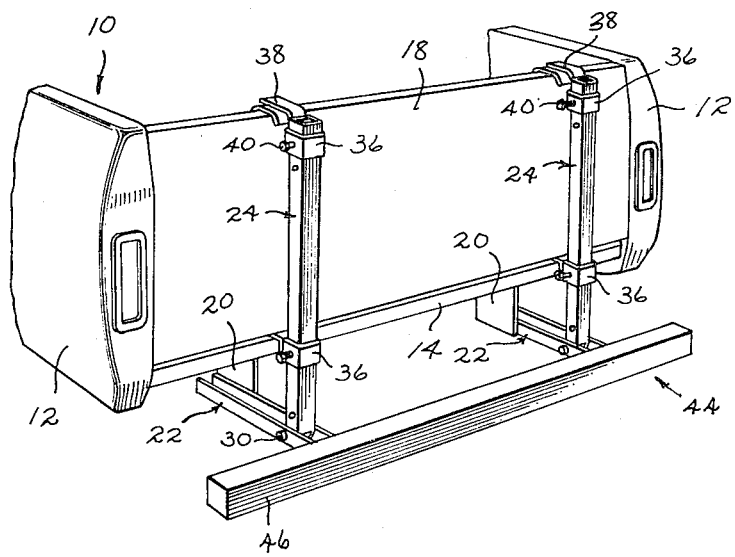
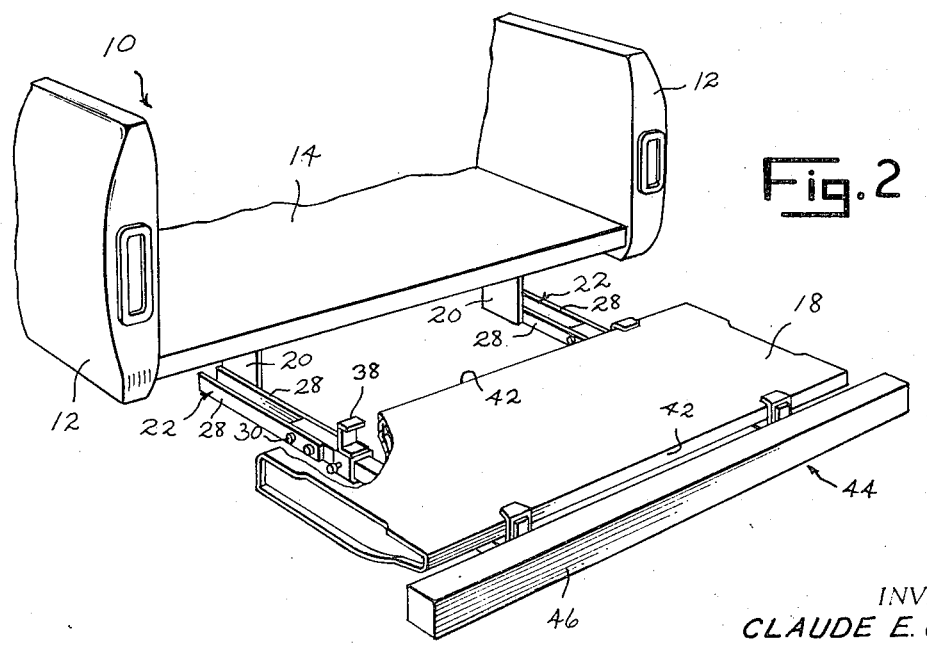
INVENTOR.
CLAUDE E. CORSON

INVENTOR.
CLAUDE E. CORSON

BY Oltsch & Knoblock

ATTORNEYS

TAILGATE BUMPER MOUNT

SUMMARY OF THE INVENTION

This invention relates to a tailgate bumper mount for a truck or similar vehicle having a bed.

The tailgate bumper mount of this invention includes a support member which is adapted for securement to the vehicle below the bed thereof and adjacent the bed opening. The support member includes an extension part which projects rearwardly of the bed opening and a pivotal part located rearwardly of the bed opening and pivotally connected to the extension part so as to be shiftable fore and aft of the vehicle. The pivotal part of the support member carries mounting means utilized for securing the tailgate of the vehicle to the pivotal part and is shiftable about its pivot connection to the extension member between a first position in which the tailgate is caused to span the bed opening and a second position in which the tailgate is located below and preferably rearwardly of the bed opening in a generally horizontal position so as to expose the bed of the vehicle for use. A bumper is carried by the support member and is secured first to the extension member when the pivotal part of the support member is in its first position. The bumper is detachable from the extension member and attachable to the pivotal part of the support member when the pivotal part is in its second position.

For many uses of a pickup truck or similar vehicle it is necessary to utilize the vehicle with the tailgate thereof lowered and even sometimes to remove the tailgate entirely from the vehicle. Additionally, when the vehicle is being utilized to carry a camper or similar recreational device, it is necessary not only to remove the tailgate but also to provide a bumper extension which projects rearwardly of the camper being carried in the bed of the vehicle. The tailgate bumper mount of this invention provides a means of lowering the tailgate of the vehicle to a position where it will not interfere with a camper carried in the vehicle bed, and in fact can be utilized as a step to gain access to the bed of the vehicle or the camper carried therein. A bumper forms a part of the mount of this invention and is shiftable into locations in which it projects rearwardly of the tailgate in both its bed opening spanning and lowered positions. The tailgate bumper mount is simple to install and is adapted to fit various makes and models of vehicles.

Accordingly, it is an object of this invention to provide a mount for a pickup truck or similar vehicle which is adapted for securement to the tailgate of the vehicle and which is utilized to shift the tailgate from its bed opening spanning position to a position below the level of the vehicle bed.

Still another object of this invention is to provide a tailgate mount for a vehicle having a bed and tailgate in which the mount is adapted for attachment to the vehicle and the tailgate thereof and is utilized to shift the tailgate from its bed opening spanning position to a position below the bed of the vehicle with the vehicle bumper being locatable at all times to the rear of the tailgate.

Still another object of this invention is to provide a mount for a pickup truck which, upon actuation, causes the tailgate of the truck to be positioned below and rearwardly of the truck bed so as to allow a camper to be carried in the truck bed and the tailgate used as a step means into the camper.

Other objects of this invention will become apparent upon a reading of the invention's description.

BRIEF DESCRIPTION OF THE DRAWINGS

A preferred embodiment of this invention has been chosen for purposes of illustration and description wherein:

FIG. 1 is a perspective view of the tailgate bumper mount of this invention secured to a pickup truck and shown with the tailgate spanning the bed opening of the truck.

FIG. 2 is a perspective view of the mount illustrated in FIG. 1 shown with the tailgate of the truck positioned below and rearwardly of the bed opening of the truck and having portions thereof broken away for purposes of illustrating the construction of the mount.

DESCRIPTION OF THE PREFERRED EMBODIMENT

Figure 3:
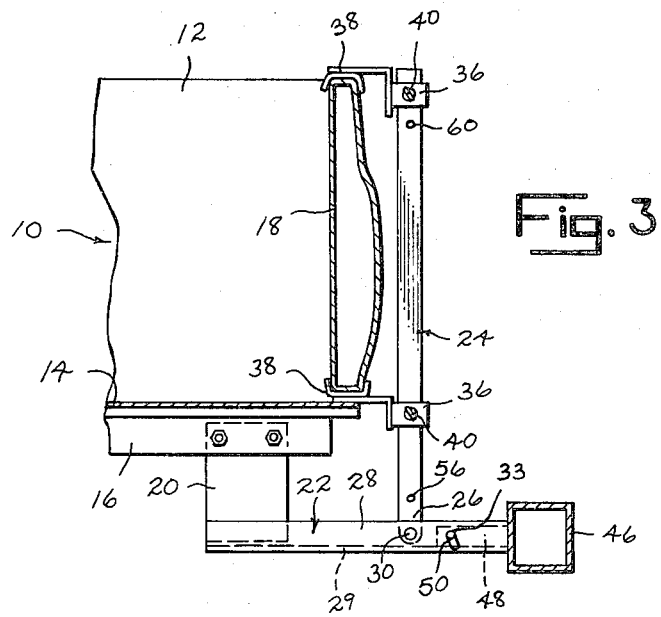
FIG. 3 is a sectional side view of the truck bed and mount illustrated in FIG. 1 and taken along the center line of the bed.

The preferred embodiment illustrated is not intended to be exhaustive or to limit the invention to the precise form disclosed. It is chosen and described in order to best explain the principles of the invention and its application and practical use to thereby enable others skilled in the art to best utilize the invention.

The bed of a pickup truck illustrated in the drawings is identified by the reference numeral 10 and is defined in part by laterally spaced fender panels 12, a floor 14 supported upon longitudinal frame members 16, and a tailgate 18.

The words "forwardly," "rearwardly" and similar directional language as used in the description and claims of this invention are with reference to the heading of the truck or vehicle.

Tailgate 18, while including the usual latch and handle release means (not shown) for locking the tailgate in its closed or bed opening spanning position illustrated in FIGS. 1 and 3, is not pivotally connected to fender panels 12 or floor 14, but instead is positioned by means of the tailgate bumper mount of this invention.

The tailgate bumper mount illustrated in the drawings includes a pair of bracket plates 20. Each bracket plate 20 is secured, such as by bolting or welding, to a truck frame member 16 and is preferably located just forwardly of the rear end edge of bed floor 14. A frame member 22 is secured at one end to each bracket plate 20 and extends rearwardly therefrom with its free end portion projecting outwardly from under bed 10. Each frame member 22 is preferably connected to its bracket plate 20 by means of welding or bolts and is preferably U-shaped in cross section, having sides 28 interconnected by a web 29. A support arm 24, which is preferably tubular, is pivotally connected to the free end portion of each frame member 22. Each support arm 24 has one end portion 26 received with slight clearance between the sides 28 of its connected frame member 22, and is pivotally connected thereto by means of a pin 30 which extends through registering apertures in sides 28 and end portion 26 of the support arm. Each pin 30 may be held within its connected frame member 22 and support arm 24 by means of a threaded nut or cotter pin (not shown).

Figure 4:
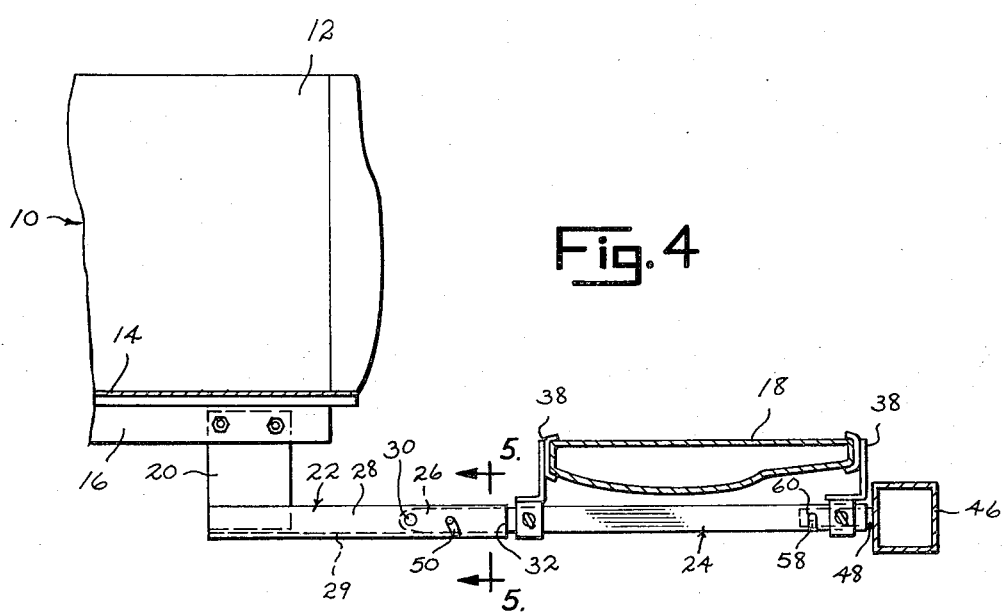
FIG. 4 is a sectional side view of the truck bed and mount illustrated in FIG. 2 and taken along the center line of the bed.
Figure 5:
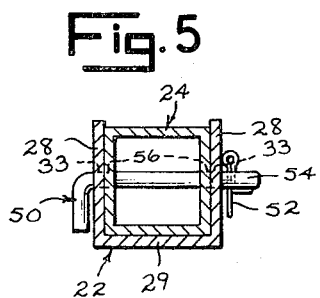
FIG. 5 is a cross sectional view of the mount taken along line 5—5 of FIG. 4.

Each support arm 24 is shiftable about its pivot connection to its frame member 22 from a generally upright position as illustrated in FIGS. 1 and 3 to a generally horizontal position as illustrated in FIGS. 2 and 4. Each pivot pin 30 is spaced inwardly from the end 32 of its connected frame member 22 so as to permit end portion 26 of its connected support arm to abut web 29 of the frame member and thus cause the support arm to be horizontally supported.

Each support arm 24 carries a pair of spaced collars 36 which encircle the support arm with slight clearance and which carry hook parts 38. Hook parts 38 of each pair of collars 36 are adapted to fit around the upper and lower edges 42 of tailgate 18. A tightening screw 40 is threaded through each collar 36 and caused to abut its encircled support arm 24 so as to fixedly position the collar relative to the support arm and thus cause tailgate 18 to be clamped between the hook parts 38 of the collars. As previously mentioned, tailgate 18 is not pivotally connected or hinged to bed 10 and therefore shifts from its bed opening spanning position illustrated in FIGS. 1 and 3 when the support arms are in their generally upright position to a lower generally horizontal position below the level of bed 10 as illustrated in FIGS. 2 and 4 when the support arms are in their generally horizontal position. Tailgate 18 is so positioned relative to support arms 24 and bed 10 that as the arms are brought from their horizontal into their vertical or upright position the tailgate passes between fender panels 12 with the lock parts of the tailgate engaging cooperative locking parts of the fender panels or bed so as to secure the tailgate in its closed or bed opening spanning position until released by manipulation of the handle of the tailgate.

Constituting a part of the tailgate bumper mount of this invention is a bumper 44. Bumper 44 includes an elongated contact member 46 which is positioned transversely of bed 10 and located, at all times, rearwardly of tailgate 18. A pair of extension members 48 extend laterally outwardly from one side of contact member 46 of bumper 44. Bumper extension members 48 are spaced apart longitudinally along the bumper contact member 46 and are located so that each extension member slides into an end 32 of a frame member 22 and is positioned between sides 28 and supported upon web 29 of the frame member when the support arm 24 connected thereto is uprightly positioned. With extension members 48 of bumper 44 inserted into frame members 22, end 32 of each frame member preferably abuts contact bumper member 46. To secure bumper 44 to frame members 22, aligned apertures 33 are formed in sides 28 of each frame member between its end 32 and the location of support arm pivot pin 30, and a registering opening is formed in each extension member 48 of the bumper. A lock pin 50 is inserted through the registering apertures 33 in the sides of each frame member and the aligned opening in bumper extension member 48 carried within each frame member.

To lower tailgate 18 so as to open bed 10 of the vehicle, each lock pin 50 is removed from frame members 22, and bumper 44 separated from the frame members. The tailgate lock (not shown) is released so as to permit the tailgate and support arms 24 to swing from the upright position illustrated in FIGS. 1 and 3 to the generally horizontal position illustrated in FIGS. 2 and 4 with end portions 26 of the support arms being supported by webs 29 at the free ends of frame members 22. Each support arm 24 includes apertures 56 therethrough which are so positioned adjacent its pivot pin 30 that the apertures are caused to register with the aligned apertures 33 in sides 28 of its connected frame member 22 as the support arm is positioned horizontally. Each lock pin 50 can then be reinserted through the sides of its frame member 22 and the registering apertures 56 of the support arm cradled within the frame member so as to lock the support arms and mounted tailgate in their horizontal position. Lock pin 50 may be retained within its frame member 22 to secure either bumper 44 or pivotally connected support arm 24 in position by means of a cotter pin 52 which is inserted through the protruding end 54 of the pin. Extension members 48 of bumper 44 are so sized and located that with support arms 24 positioned horizontally, as illustrated in FIGS. 2 and 4, the extension members can be inserted endwise into the open free ends of the support arms 24 and secured thereto by means of lock pins 58 which are inserted through aligned apertures 60 in the free end portions of the support arms and the registering aforementioned openings (not shown) in the bumper extension members 48. Lock pins 58 may be secured within their respective support arms 24 by means of cotter pins used in a similar fashion as the cotter pin 52 in lock pin 50.

It is to be noted that with the tailgate bumper mount of this invention tailgate 18 may be utilized as a lower step into the truck bed 10 or a camper or similar device carried within the truck bed 10 when positioned as shown in FIGS. 2 and 4. It is to be understood that the invention is not to be limited to the details herein given but may be modified within the scope of the appended claims.

What I claim is:

1. A mount for a truck or similar vehicle having a bed with a tailgate comprising a support member secured to said vehicle below the bed thereof and adjacent the opening of said bed, said support member including an extension part projecting rearwardly of said bed opening and a pivotal part located rearwardly of said bed opening and pivotally connected to said extension part so as to be shiftable fore and aft of said vehicle, said pivotal part carrying mounting means secured to the tailgate of said vehicle, said pivotal part being shiftable about its support member pivot connection between a first position wherein said tailgate spans said bed opening and a second position wherein said tailgate is located below said bed opening to expose the bed of said vehicle, and a bumper carried by said support member.

2. The mount of claim 1 wherein said pivotal part is shiftable between an upright position in which said tailgate spans said bed opening and a horizontal position in which said tailgate is located below and rearwardly of said bed opening.

3. The mount of claim 2 wherein said bumper is removably mounted to said extension part when said pivotal part is in its upright position and is removably mounted to said pivotal part when the pivotal part is in its horizontal position, said bumper being located rearwardly of said tailgate when mounted to either said extension part or pivotal part.

4. The mount of claim 1 wherein said extension part constitutes a pair of elongated laterally spaced parallel frame members positioned under said bed opening with portions thereof extending rearwardly of said bed opening, said frame members being located adjacent opposite sides of said vehicle, means securing said frame members to said vehicle, said pivotal part including a pair of support arms, each arm being pivotally connected at one end about a horizontal transverse axis to one end portion of a said frame member and rearwardly of said bed opening, each arm being shiftable fore and aft of said vehicle about its pivot axis between a generally upright position wherein the free end thereof projects above the level of the floor of said bed and a generally horizontal position wherein the free end thereof projects in a rearward direction relative to said vehicle, said arms including means securing said tailgate thereto whereby said tailgate will be carried by said arms from a position spanning said bed opening when said arms are upright to a generally horizontal position below said bed opening when said arms are positioned horizontally.

5. The mount of claim 4 wherein said bumper is removably mounted to said frame members when said arms are upright and is removably mounted to said arms when said arms are positioned horizontally.

6. The mount of claim 5 and including cooperating securement means carried by said bumper and said arm and frame members for releasably mounting said bumper to the respective free ends of said arm and frame members.

7. The mount of claim 4 wherein each frame member is U-shaped in cross section and includes spaced sides interconnected by a lower web, each pivotally connected arm end fitting between the sides of its connected frame member and being journaled upon a transverse pivot pin extending through said sides, each arm being shiftable from its upright position to its horizontal position wherein said arm rests upon the web of its connected frame member, and locking means cooperating with each arm and connected frame member to lock said arm in its horizontal position.

8. The mount of claim 7 wherein said locking means is a pin removably inserted through registering openings in said cooperating arm and sides of said connected frame member.

9. The mount of claim 7 wherein said bumper is removably mounted to said one end portion of each frame member when said arms are upright and is removably mounted to the free end of each arm when said arms are horizontal.

10. The mount of claim 9 wherein said locking means is a pin removably inserted through registering apertures in the sides of each frame member between the end thereof and the arm pivot connection, said bumper including a pair of spaced laterally projecting extensions each adapted to fit into the one end portion of a frame member, each bumper extension having a transverse opening therethrough which registers with the apertures in the sides of the extension-receiving frame member and through which said pin is inserted to lock said bumper to said frame member, each arm having a transverse opening therethrough which registers with the apertures in the sides of its connected frame member and through which said pin is inserted to lock said arm in its horizontal position.

* * * * *